Oct. 4, 1966    A. A. HONEYMAN    3,276,550
BRAKEABLE HAND TRUCK
Filed Sept. 14, 1964
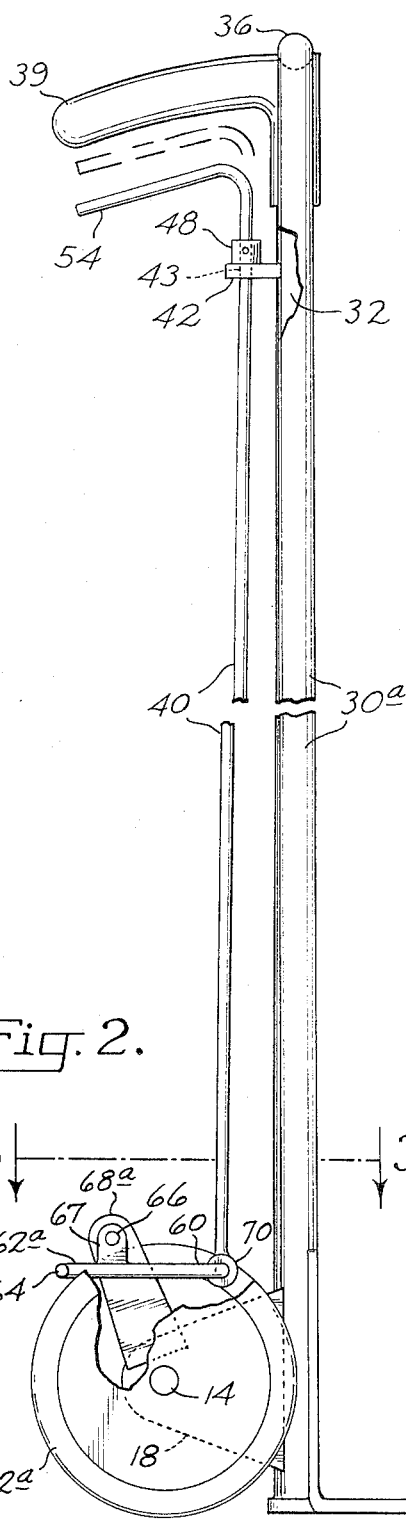
Arthur A. Honeyman
INVENTOR.
BY Ramsey, Kalisch and Hertzell
Attys.

3,276,550
BRAKEABLE HAND TRUCK
Arthur A. Honeyman, Portland, Oreg., assignor to Honeyman Manufacturing Co., Portland, Oreg., a corporation of Oregon
Filed Sept. 14, 1964, Ser. No. 396,201
4 Claims. (Cl. 188—29)

This invention relates to hand trucks, and more particularly to such trucks with hand-operable brake mechanisms.

When working with a heavily loaded hand truck, particularly on an inclined support surface, a user may spend considerable effort holding the truck stopped or keeping the truck from rolling out of control. An easily operated brake mechanism in a hand truck is desirable as it saves both time and effort, and in addition provides a factor of safety. Hand-operated brake mechanisms for hand trucks are known, but most may be characterized as being either complex, unduly expensive, or otherwise impractical.

It is, therefore, an object of this invention to provide an improved hand truck with brakes, which is simply constructed, yet highly reliable in operation. Because of its simple construction, the production cost of a truck according to the invention is not significantly greater than a comparable hand truck made without a brake.

A further object is to provide a novel truck with brake mechanism, featuring a brake handle which underlies in close adjacency a truck handle joined to the frame of the hand truck. A user may guide the hand truck and actuate the brake when necessary by squeezing the brake handle and truck handle whereby the two are drawn together. Thus a user may guide and brake a heavily loaded hand truck entirely with one hand.

Yet another object is to provide novel brake mechanism in a hand truck which automatically disengages upon a brake handle for the mechanism being released. As contemplated herein, a novel construction is featured whereby release occurs as the result of gravity pulling pulling upon parts in the mechanism.

A still further object is to provide a novel brake mechanism for hand trucks which once it is engaged to brake the forward travel of wheels in the hand truck by the action of the wheels tends to be urged into greater engagement, thus to be in a sense self-actuating.

Other objects and advantages included in this invention but not specifically mentioned will become more clearly apparent from the following specification and drawings, wherein:

FIG. 1 is a perspective view of a hand truck including a hand-operated brake mechanism according to one embodiment of the invention;

FIG. 2 is a side elevation of the hand truck, on a slightly enlarged scale, showing further details of the brake mechanism and with a portion of one wheel broken away; and FIG. 3 is a cross sectional view, taken generally along the line 3—3 in FIG. 2.

Referring to the drawings, a two-wheeled hand truck is shown, designated by the numeral 10. Supporting truck 10 are two lateral support wheels 12a, 12b. The wheels are journaled on opposite ends of an axle 14 carried to the rear of an elongated upright truck frame 20.

Axle 14 extends through and is mounted within brackets 18 fastened to the back side of frame 20 adjacent the latter's lower end above the wheels. Projecting forwardly from the bottom of frame 20, and substantially perpendicular thereto, is a blade 24 substantially coextensive in length with axle 14. The rigid combination of frame 20 and blade 24, when tilted over the axle, provide sturdy support for a load as such load is moved over the ground by the wheels journaled on the axle.

The frame includes two outside bars or members 30a, 30b, and a central member or bar 32, all of which rise substantially parallel to one another from blade 24. Member 32 extends along substantially the longitudinal midline of the hand truck. Connecting the upper ends of the three frame members is a cross member 36. A truck handle 39 joins frame 20 at the union 38 of cross member 36 with member 32. Truck handle 39 projects to the rear of the frame, and by grasping this handle a user may conveniently move the hand truck while conveying a load from one place to another using one hand.

Disposed below handle 39 and directly behind bar 32 is a brake actuating rod 40. This rod substantially parallels bar 32, and is mounted for up and down movement at the rear of the frame by a guide means 42 which is attached to the back side of bar 32. Guide means 42 may comprise a horizontal piece with a vertical aperture 43 therethrough loosely receiving rod 40 whereby the rod may slide freely in a vertical direction and also change to some extent its angular position relative to piece 42, by limited lateral displacement of the lower portion of rod 40. A stop 48 is mounted on the rod above the guide, designed to engage the upper surface of the guide 42 thus to limit further downward travel of the rod. The normal at rest position of the rod is the position indicated by the solid lines in FIG. 2. A brake handle 54 is mounted on the upper end of brake actuating rod 40, which extends out at an angle therefrom directly below the truck handle. With the actuating rod in its normal at rest position, the brake handle is close enough to truck handle 39 to be conveniently grabbed together with the truck handle with one hand.

Referring now to FIG. 3, brake mechanism adjacent the base of the hand truck is provided comprising a U-shaped brake rod 60, having a pair of oppositely disposed legs 62a, 62b joined by a center portion 63. Legs 62a, 62b terminate in substantially aligned laterally outwardly projecting ends 64a, 64b, respectively, that overlie the peripheries of wheels 12a, 12b. The brake rod is journaled between its ends on lugs 68a, 68b fastened to brackets 18, through pivot pins 66 fastened to ears 67 projecting outwardly from the brake rod. With this arrangement, rod 60 is rotatable about a transverse axis defined by pins 66.

Central portion 63 of the brake rod extends through a sleeve 70 joined to the lower end of the brake-actuated rod. The connection so provided enables the central portion of the brake rod to be raised, while moving in an arcuate path about the horizontal transverse axis defined by pins 66 by elevating the actuating rod, with such central portion rotating relative to the base of the actuating rod.

It will be noted that center portion 63 of the brake rod is located well forwardly of pivot pins 66 defining the transverse axis about which the brake rod pivots. It will be further noted that the mass of the brake-actuating rod 40 is, for the most part, directly above this forwardly located center portion of the brake rod. This is important in release of the brake mechanism as will hereinafter be described. The aligned ends 64a, 64b which overlie the peripheries of the wheels and brake the wheels by coming down against these wheel peripheries are located to the rear of the frame from the axis about which wheels 12a, 12b rotate, namely, the longitudinal axis of axle 14. The pivot axis for the brake rod defined by pins 66 is spaced radially outwardly somewhat from the peripheries of the lateral support wheels. With the brake mechanism engaged, these features result in a self-actuating effect as will also be described in more detail.

Describing the operation of the hand truck and brake, to apply the brake the user raises brake handle 54 which may be done by grasping the brake and truck handles together with one hand and squeezing the handles together.

This raises the center portion of the brake rod and causes ends 64a, 64b to move downwardly across the outer surfaces of the lateral support wheels on the truck. In FIG. 2, the dashed position for the handle and rod illustrate the parts in the position they have when braking is being performed.

In the ordinary case, in using the hand truck it is pushed forwardly with the support wheels then rotating in a clockwise direction in FIG. 2. With such direction of rotation and upon braking being performed by the brake rod, the surfaces of the wheels through contacting the ends of the brake rod exert forces tending to draw the ends downwardly in FIG. 2 thus to increase the clamping pressure of the ends against the peripheries of the wheels. The wheel peripheries, of course, slip under the ends of the brake rod and this action is not so great as to produce complete stopping of the wheels once initial contact has been made. However, the action is sufficient to assist in maintaining braking effect once started and contribute significantly to ease in using the truck.

To release the brake the operator releases the brake handle. The force of gravity then by pulling on the center portion of the brake rod and the actuating rod connected thereto causes the brake rod to swing in a clockwise direction in FIG. 2 with the ends of the rod moving upwardly and out of engagement with the support wheels. Downward movement of the actuating rod continues until stop 48 contacts guide piece 42.

With the truck handle located adjacent the top and center of the hand truck frame, proper control and movement of the hand truck through one hand is facilitated, since with tilting of the truck a balanced condition tends to result. The longitudinally extending center bar 32 contributes rigidity to the frame where it is needed along the midline thereof. The bar also functions to shield or protect actuating rod 40 which is directly behind it from any load carried by the truck. The brake mechanism and means for actuating it are entirely behind the truck frame 20, but certain loads of irregular outline could protrude behind the frame on being handled and this protection rendered by the center bar is important.

The brake mechanism described may be incorporated with other types of trucks than the one specifically herein illustrated and certain variations and changes may be made in the brake mechanism and the means for actuating it without departing from the invention. It is desired to cover all modifications and variations of this invention as would be apparent to one skilled in the art and that come within the scope of the appended claims.

It is claimed and desired to secure by Letters Patent:

1. In a hand truck including
a load-supporting frame and opposed lateral support wheels for the frame supporting the frame for movement over the ground,
a brake rod with ends positioned over the wheels,
means journaling the brake rod on the frame adjacent opposite sides of the hand truck whereby the rod is pivotable about a horizontal axis extending between the sides of the truck,
said brake rod including an intermediate portion disposed forwardly on the hand truck from said journaling means which is swingable up and down in an arc on pivoting of said rod about said horizontal axis,
an actuating rod pivotally connected to said forwardly disposed intermediate portion extending upwardly thereupon,
means on said frame mounting said actuating rod accommodating up and down movement therein and such lateral displacement as is necessary to accommodate the arcuate movement of said intermediate portion of said rod, and
a brake handle joined to the upper end of said actuating rod.

2. In a hand truck including
an elongated upright load-supporting frame and opposed lateral support wheels adjacent the base and to the rear of said frame supporting the frame for movement over the ground,
a brake rod with ends positioned over the wheels at points disposed rearwardly of the axis of said wheels from said frame,
means journaling the brake rod on the frame adjacent opposite sides of the hand truck whereby the rod is pivotable about a horizontal axis extending between the sides of the truck,
said brake rod including a portion intermediate its ends disposed forwardly on the hand truck from said journaling means which is swingable up and down in an arc on pivoting of said rod about said horizontal axis,
an actuating rod pivotally connected to said forwardly disposed portion of the brake rod extending upwardly from the brake rod,
means on said frame mounting said actuating rod accommodating up and down movement therein and such lateral displacement as is necessary to accommodate the arcuate movement of said forwardly disposed portion of said rod,
a brake handle joined to the upper end of said actuating rod, extending rearwardly of said load-supporting frame, and
a truck handle joined to said frame extending rearwardly of said load-supporting frame disposed over said brake handle in position to be grasped together with said brake handle by one hand.

3. In a hand truck including
an elongated upright load supporting frame and opposed lateral support wheels adjacent the base and to the rear of said frame for supporting the frame for movement over the ground,
said load supporting frame including an elongated bar extending upwardly along substantially the longitudinal midline thereof and a blade adjacent its bottom end projecting toward the front of the truck,
a truck handle extending rearwardly of said frame joined to the frame adjacent the top of said bar,
an elongated brake actuating rod substantially paralleling said bar and directly behind the bar thus to be shielded by the bar having a brake handle joined to the upper end thereof beneath and substantially paralleling said truck handle in position to be grasped together with said truck handle by one hand, and
brake mechanism for said support wheels operatively connected to the bottom end of said brake actuating rod constructed and arranged whereby upon drawing up of the brake handle toward the truck handle the brake mechanism engages to brake said wheels.

4. In a hand truck, the combination, in operative position, of
an upright frame including a front and back and a blade adjacent its bottom end projecting from said front of the frame,
axle means mounted on the back of said frame adjacent said blade,
a pair of lateral support wheels on opposite sides of said frame mounted on said axle means for supporting said truck,
a truck handle mounted adjacent the top and center of said frame projecting rearwardly from the back thereof,
a brake actuating rod mounted on said frame extending downwardly from under said truck handle,
guide means on said frame mounting said brake actuating rod for up and down movement relative to said frame,
a brake handle joined to the top of said brake actuating rod and projecting under said truck handle in position to be grasped with one hand together with said truck handle, and
brake mechanism for said support wheels operatively connected to the bottom end of said brake actuating rod constructed and arranged whereby upon drawing up of the brake handle toward the truck handle the brake mechanism engages to brake said wheels, said brake mechanism comprising a substantially U-shaped brake rod having a center portion and a pair of oppositely disposed legs which terminate in substantially aligned laterally outwardly projecting ends disposed over said wheels, said center portion being positioned to the front of the frame from said ends and said legs being pivotally mounted between said ends and center portion at points located relative to the brake rod whereby gravity urges release of the brake mechanism by downward movement of said center portion and upward movement of said ends.

References Cited by the Examiner
UNITED STATES PATENTS

| | | |
|---|---|---|
| 1,583,413 | 5/1926 | Miller et al. |
| 2,638,183 | 5/1953 | Prowinsky _____ 188—29 |
| 3,169,597 | 2/1965 | Holloway _____ 188—29 X |
| 2,639,785 | 5/1953 | Vickers _____ 188—29 |

DUANE A. REGER, *Primary Examiner.*